(12) United States Patent
Mikhailov et al.

(10) Patent No.: US 8,850,216 B1
(45) Date of Patent: Sep. 30, 2014

(54) CLIENT DEVICE AND MEDIA CLIENT AUTHENTICATION MECHANISM

(75) Inventors: Mikhail Mikhailov, Newton, MA (US); Raj Nair, Lexington, MA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 306 days.

(21) Appl. No.: 13/476,190

(22) Filed: May 21, 2012

Related U.S. Application Data

(60) Provisional application No. 61/487,888, filed on May 19, 2011.

(51) Int. Cl.
*G06F 21/00* (2013.01)

(52) U.S. Cl.
USPC ............................. 713/182; 713/185; 713/186

(58) Field of Classification Search
None
See application file for complete search history.

(56) References Cited

U.S. PATENT DOCUMENTS

| | | | | |
|---|---|---|---|---|
| 7,512,973 | B1 * | 3/2009 | Chan et al. ...................... | 726/10 |
| 2003/0063750 | A1 * | 4/2003 | Medvinsky et al. .......... | 380/277 |
| 2004/0030921 | A1 * | 2/2004 | Aldridge et al. .............. | 713/200 |
| 2004/0253942 | A1 * | 12/2004 | Mowry et al. ................. | 455/410 |
| 2006/0233372 | A1 * | 10/2006 | Shaheen et al. ............... | 380/255 |
| 2008/0046758 | A1 * | 2/2008 | Cha et al. ....................... | 713/189 |
| 2011/0213969 | A1 * | 9/2011 | Nakhjiri et al. ................ | 713/158 |
| 2012/0102566 | A1 * | 4/2012 | Vrancken et al. ............... | 726/20 |
| 2013/0179199 | A1 * | 7/2013 | Ziskind et al. ..................... | 705/5 |

OTHER PUBLICATIONS

Local and Push Notification Programming Guide, Apple Computer, http://developer.apple.com/library/mac/documentation/ NetworkingInternet/Conceptual/RemoteNotificationsPG/ RemoteNotificationsPG.pdf, 56 pages, Aug. 9, 2011, (c) 2011 Apple Inc.

* cited by examiner

*Primary Examiner* — Peter Poltorak

(57) ABSTRACT

Establishing trusted communication with a media client application on a client device includes receiving an identifying token originating in a secure messaging session between a messaging server and the client device, and sending an encrypted generated nonce to the messaging server for delivery to the client device. A blob request message is received that includes a decrypted nonce value and identifies the client device, user, and content owner. The blob request message is tested and a blob is conditionally sent to the client device that includes a secret value for accessing an API via which the client device obtains decryption keys for decrypting protected media. Testing includes evaluating whether the decrypted nonce value matches the generated nonce value. The blob request message may include device integrity information to evaluate whether the device has been tampered with, as a further condition to allowing access to the protected media.

20 Claims, 4 Drawing Sheets

CLIENT DEVICE AND MEDIA CLIENT AUTHENTICATION MECHANISM

BACKGROUND

Proliferation of feature-rich and powerful smart phones and tablets is fueling interest in and demand for mobile video delivery. Content owners are racing to offer their video content on such mobile devices as Apple's iOS-based iPhone and iPad, BlackBerry smart phones and PlayBook tablet, and on a multitude of phones and tablets running Google's operating system Android. A key requirement of any content delivery system is content protection, or Digital Rights Management (DRM), which includes encryption of the actual content bits stored in the distribution network and delivered to mobile devices, as well as management of digital rights acquired by users.

SUMMARY

The reality of the current landscape of mobile devices is such that the most popular devices, such as those listed above, provide no hardware-based assistance to software components running on these devices in ensuring the safety of content delivered to them. One aspect of the problem is the lack of a reliable and guaranteed way for a DRM system to authenticate client devices. A DRM system must be certain that its client-side components which issue requests for content decryption keys to a DRM server really are running on a mobile device, really are running on the valid and licensed mobile device, and that it is the genuine and unmodified client who is issuing these requests, before media decryption keys are issued.

Described herein is a secure mechanism for a DRM system to authenticate client devices and its own client-side DRM components as a condition to allowing access to content or media of a content owner. In particular, the present disclosure describes a method by which a media support server establishes trusted communication with a media client application executing on a media client device used by a user. The method includes receiving a token that originates in a persistent secure messaging session used for carrying messaging communications between the media client device and a messaging server, the token uniquely identifying the media client device and the media client application. A nonce message is created and sent to the messaging server for delivery to the media client device via the persistent secure messaging session. The nonce message includes an encrypted nonce value resulting from encryption of a generated nonce value according to a nonce encryption process. The nonce encryption process has a counterpart nonce decryption process configured into the media client application for use in decrypting the encrypted nonce value.

The media client device then sends a blob request message that identifies the media client device, the user, and the content owner. The blob request message also includes a decrypted nonce value obtained by decrypting the encrypted nonce value in the nonce message. The media support server tests the blob request message, and conditionally sends a blob message to the media client device via a secure channel based on the testing, where the blob message includes a secret value usable by the media client application to access protected media of the content owner for playback to the user. Specifically, the secret value allows the media client to securely access an application programming interface (API) the media support server via which the media client can obtain decryption keys used to decrypt protected media that is delivered to the media client in encrypted form. The testing includes evaluating whether the decrypted nonce value matches, or otherwise has a predetermined relationship to, the generated nonce value. The blob request message may also include device integrity information usable to evaluate whether the device has been tampered with, as a further condition to allowing access to the protected media.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
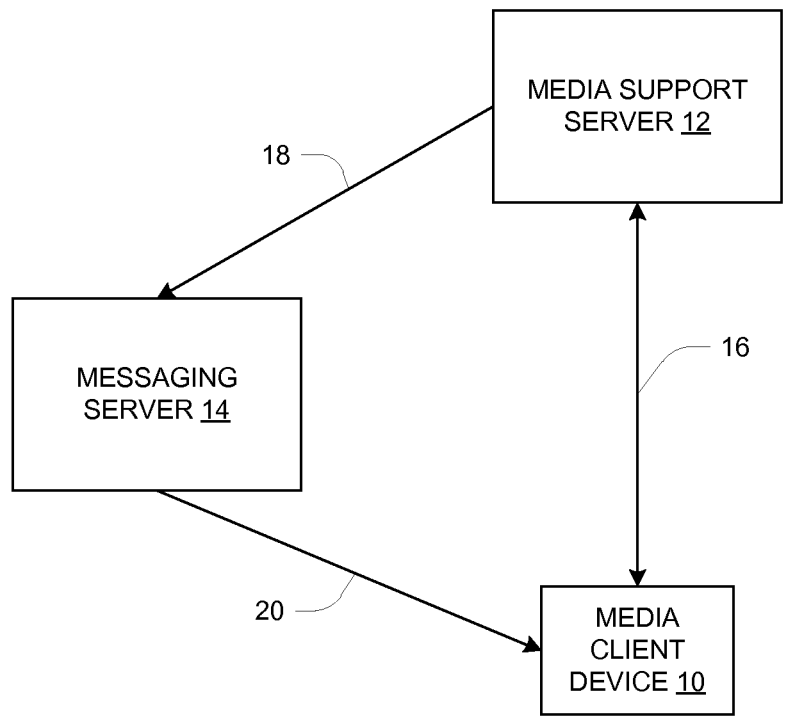
FIG. 1 is a block diagram of a client-server system.

FIG. 1 is a block diagram of a client-server system used to support the delivery of media or content such as video, audio, images such as from medical imaging or document scans, etc. to a media client device 10. The system includes a media support server 12 and a messaging server 14, with respective connections 16, 18 and 20 among the components as shown. These connections are typically logical connections carried in one or more physical networks. The present technique finds particular application in delivering media over public wide-area networks such as the Internet, in which case some or all of connections 16, 18 and 20 are logical connections or pathways through physical Internet cables, switches, routers, etc.

The media support server 12 is a back-end server appliance providing certain functionality in a media delivery system. It may perform video ingestion and digital rights management (DRM) functions, as well as handling device registration and media playback requests from media client devices 10.

In connection with its use of media, the media client device 10 implements the client side of a DRM scheme. DRM generally involves the purposeful encryption or other modification of digital media so that it can only be played back through use of a secret key, giving the media owner and/or distributor greater control over the consumption of the media by end users. In the present context, DRM includes the need for the media client device 10 to securely register with a media server and establish a secure connection over which media will be delivered. The present description is directed to a robust mechanism for enabling a media support server to securely authenticate a media client application on a media client device, such authentication establishing trust in the media client application and enabling delivery of a secret value that can be used by the media client application to complete a registration process and subsequently obtain media for playback.

Figure 2:
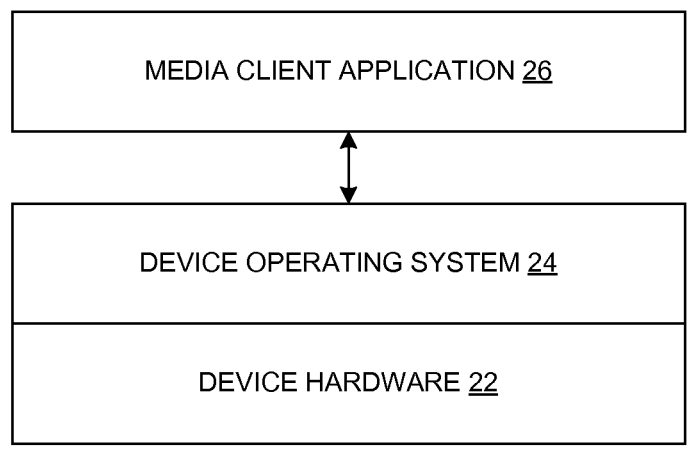
FIG. 2 is a block diagram of a media client device.

FIG. 2 shows an example organization of the media client device 10, which is a user device such as a smartphone or tablet capable of retrieving media from a media server and playing it back to a user. The media client device 10 includes device hardware 22 such as communications circuitry, processing circuitry, user interface circuitry including a display screen (which may be touch-sensitive), etc. as generally known in the art. The processing circuitry includes one or more processors, memory and interface circuitry all interconnected by one or more data buses, and the memory stores computer program instructions (software and/or firmware) that are executed by the processor(s) to realize corresponding functionality during operation. Typically this software/firmware includes a device operating system 24 and one or more application programs including a media client application 26, also referred to herein as a "media client" 26. The device operating system 24 has typical operating system responsibilities including providing an interface between the media client 26 and the device hardware 22. In the present context, the device operating system 24 also serves as the client endpoint of the connection 20 to the messaging server 14. In one example, the media client device 10 is a smartphone sold by Apple Computer, Inc. under the trademark iPhone®, and the device operating system 24 is the iOS operating system embedded in the iPhone smartphone.

During operation, a persistent messaging session is maintained on the connection 20 by which the messaging server 14 delivers messages to the media client device 10. The session may be part of a so-called "notification service" of the type known in the art. One aspect of the messaging service is that the messaging session is a secure session to which an attacker has no access. In one embodiment, the messaging service is a notification service offered by the maker of the device operating system 24. The messaging session uses a unique device identifier for the media client device 10 which is different from any identifier generated within the media client device 10 itself that are accessible to applications running on the device 10, such as a device identifier generated by the device operating system 24 for example. This messaging session is used to provide indirect communication from the media support server 12 to the media client application 26 running on the media client device 10. Use of this separate secure channel greatly increases confidence that the recipient of the communication is in fact a legitimate media client application 26 executing on a legitimate physical media client device 10, not a fraudster who may be attacking the system using a simulator on personal workstation for example.

The disclosed technique is directed to securely delivering a data item referred to as a "blob" from the media support server 12 to the media client device 10. As generally known in the data security field, a blob is a large collection of data containing a secret value or values that are typically hidden or obfuscated in some manner. In the present context, the media client 26 and media support server 12 need to establish a common shared secret so they can exchange encrypted messages as part of a secure session reflecting a user's right to obtain protected media. The blob is a way to exchange a secret. The media support server 12 packages a secret into a blob in a way that is customized to the particular media client device 10, user, and owner, so that the secret hidden inside the blob can be retrieved from the blob only on that particular device and only when that particular user is logged into the media client application 26. A blob can be constructed in many different ways (in other words, the secret can be hidden inside the blob in many different ways). One approach is to somehow mix random bytes with the bytes that constitute the secret value(s). A successful attack would require knowledge of the exact algorithm in order to retrieve the secret bytes from the blob. Another approach is to encrypt the secret bytes. One could also apply obfuscation to the secret values first, and then encrypt the result, etc.

In one embodiment, communications between the media support server 12 and a legitimate media client device 10 are protected through use of encryption according to the Advanced Encryption Standard or AES, which is a symmetric key cryptographic algorithm. The media support server 12 and media client 26 share a secret key. However, the media client 26 does not store the key in clear-text form, rather it utilizes a so-called "white-box" AES implementation with that key. A white box decryptor is an implementation of a cryptographic algorithm with a particular encryption or decryption key, done in such a way that the algorithm and the key are combined into a single inseparable and indistinguishable entity which can be accessible to an attacker in clear-text form without enabling the attacker to extract or identify the key. In one form, an AES decryption algorithm is implemented as a series of lookups in a large number of tables, with the decryption key hidden in these tables in such a way that the attacker can freely access these tables and observe the execution of the algorithm and yet be unable to extract or determine the key used by the algorithm. This use of AES encryption ensures that only the media client 26 can decrypt an encrypted "nonce" issued by the media support server 12, as described more below. Also, the protocol requires that the media client 26 return a copy of the same nonce in its request for the blob, providing assurance that the blob request generated by the media client 26 was not altered in transit.

One known problem with certain media client devices 10, especially mobile devices such as smartphones for example, is the increased potential for physical compromise of the device by an attacker/hacker, giving the attacker more access to the device than originally allowed by the manufacturer. A device in such a compromised state may be referred to as "jail-broken". For example, an attacker can install additional software and monitoring/debugging tools, including tools which provide more access to the device internals or even replace certain aspects of the device environment. The latter can include the reporting of a fake device id, overwriting the original unique device identifier. These mechanisms can be used to thwart security measures, so it is desirable to assess the integrity of the media client device 10 as a condition to trusting it.

Figure 3:
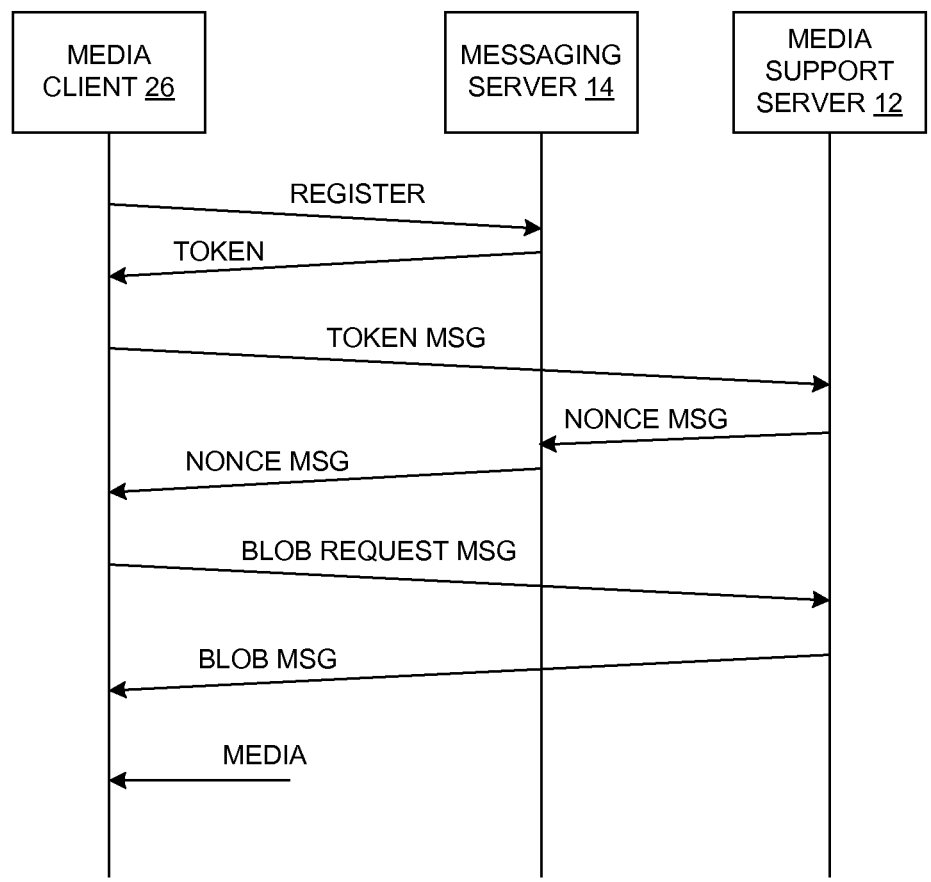
FIG. 3 is a messaging diagram for a client authentication process.

FIG. 3 is a messaging diagram illustrating overall operation of the authentication process. Every time the media client 26 is launched on the media client device 10, the media client 26 asks the device operating system 24 to register it with the messaging server 14 (indicated by REGISTER in FIG. 3). The media client device 10 establishes a persistent, accredited and encrypted network connection with the messaging server 14 and receives notifications over this persistent connection. Based on the device- and application-specific information supplied by the device operating system 24, the messaging service generates a long device token (e.g., 32 bytes in the case of iOS) for use in identifying the media client 26 to the messaging service. This token is unique to the media client device 10 and the media client application 26, and it is different from the typical unique device identifier available through a device operating system API available to the media client application 26. This token is returned to the device operating system 24 (indicated by TOKEN), which in turn supplies it to the media client 26.

On receiving the token, the media client 26 sends the token to the media support server 12 (TOKEN MSG) via a secure connection such as SSL. The media support server 12 responds by generating a nonce message (NONCE MSG) and forwarding it to the messaging server 14 for delivery to the media client 26. The nonce message includes a unique nonce value generated by the media support server 12 using a highquality, cryptographically secure random number generator (e.g., /dev/random on Linux systems). In one example, the nonce is a 128-bit value. The generated nonce is encrypted using AES symmetric encryption algorithm with a 128-bit "nonce key" (NK), which may have been generated separately on a development server ahead of time using /dev/random or a similar random number generator. The same 128-bit nonce key is embedded in the white-box AES decryptor used by a legitimate media client 26. The media client 26 cannot proceed with device registration unless it receives the nonce message and takes other steps as described below.

When the media client 26 receives the encrypted nonce from the media support server 12 via the nonce message, it decrypts the nonce using the white-box AES decryptor, and it performs a series of checks to determine whether the media client device 10 has been tampered with ("jail-broken"). In this checking it gathers certain information that is indicative of the device integrity (freedom from tampering). It then generates a blob request message (BLOB REQUEST MSG) for sending to the media support server 12 that contains the following elements: user token (identifies the actual user logged into the media client 26), owner identifier (identifies content owner, which could be viewed as the identifier for the application, if one application corresponds to a single content owner, or if a single application supports multiple content owners, this identifier really identifies the content owner), device id, the decrypted nonce, and the device integrity information. This information is encrypted using a white-box 128-bit AES encryptor using a 128-bit blob request key (BRK). The blob request key may likewise have been generated beforehand on a development server using /dev/random or similar random number generator. In general, it is preferred that the blob request key be different than the nonce key.

The media support server 12 decrypts the contents of the blob request message using the blob request key, and performs certain tests that must be satisfied as a condition to returning the requested blob to the media client 26. First, the nonce contained in the message must match the nonce generated by the media support server 12 and included in the nonce message sent to the messaging service. The device integrity information is also evaluated to determine whether the media client device 10 has been tampered with. Specific examples of the integrity checking are given below. If the nonce does not match, then the entity that sent the blob request message is not to be trusted, and typically the blob will be withheld so that the entity is unable to complete registration and establish the secure channel required to receive protected content. If the nonce matches but the device integrity information indicates that the device may be jail-broken, then the device may be blacklisted and/or other appropriate action taken. Options for other action include: serving lower-quality content, serving a subset of the content from an available catalog (for example, content owner A may not care about jail-broken devices, while content owner B may not want their content on such devices, etc.), and limiting the number of items of content that a user can view (or using other throttling options). Another test performed by the media support server 12 is to check that the blob request message was received within a short defined time period (e.g., 30 seconds) after the nonce message was sent to the messaging service. Excessive delay can also be an indicator of an untrustworthy operating environment.

If the testing is successful, i.e., confirms a conclusion that the originator of the blob request is indeed a trustworthy media client 26, then the media support server 12 generates a blob which is customized for the particular owner, user, device, and nonce, and this blob is sent to the media client 26 in a blob message delivered using the SSL connection. As previously described, the blob is a large collection of bytes containing a hidden secret. In one instance, the blob may be constructed using an obfuscation algorithm which hides the secret bytes among randomly generated bytes. In another instance, the blob may represent an encrypted secret. In yet another instance, the blob may contain obfuscated secret which is further encrypted.

Upon receiving the blob in the blob message, the media client 26 recovers the shared secret value stored within it and uses the secret value in connection with subsequent device registration and media playback requests. In particular, it uses the secret value for encrypting and decrypting media session messages exchanged with the media support server 12. In one embodiment, the blob request constitutes a beginning part of device registration, and subsequent actions and messaging are used to complete the registration. The media client 26 can then request media decryption keys along with rights information from the media support server 12 so as to be able to playback media.

The following are examples of tests that can be used to determine whether the media client device 10 has been tampered with and/or whether the operating environment of the media client 26 has been tampered with. Some of these examples may be specific to the iOS device operating system 24; analogous tests and/or other tests may be performed in devices using other device operating systems:

The library which returns UDID has the correct address
The address of the native video player is valid
Check that no debugger or similar tool is attached to the media client process
Checks of file permissions and other run-time environment parameters (privileges, etc.)
Checks for presence of files typically present on a jail-broken device, such as files which are part of malware such as Cydia, ssh, gdb.

Figure 4:
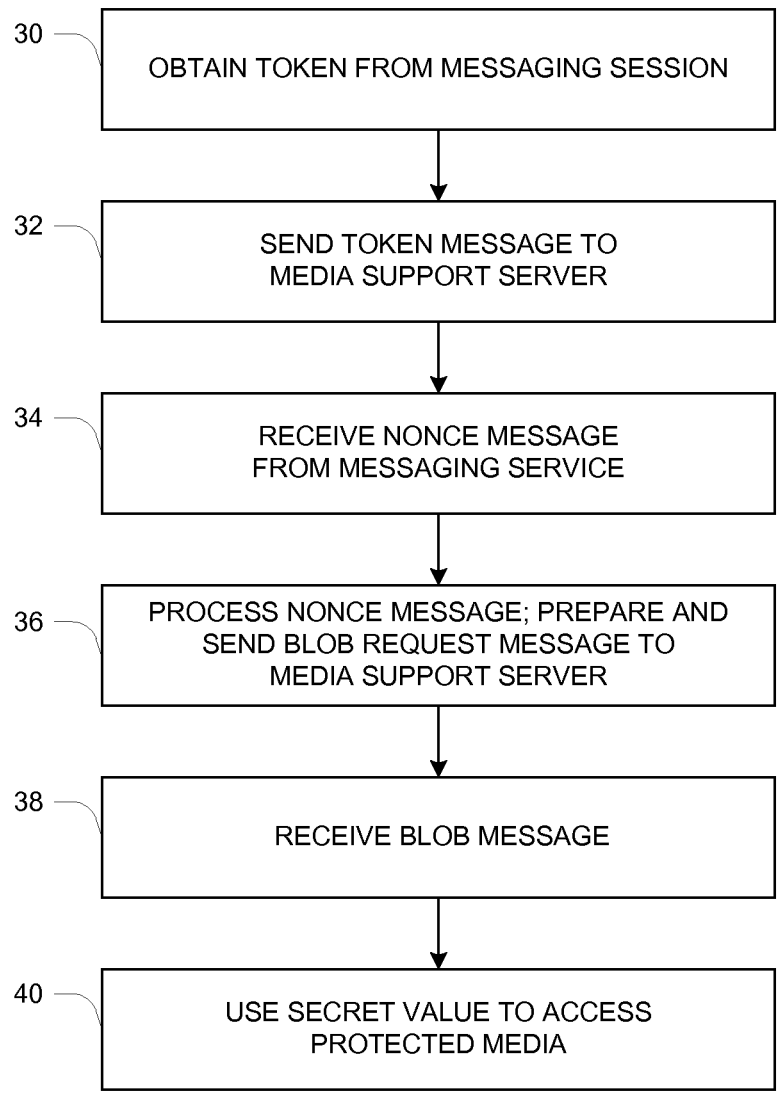
FIG. 4 is a flow diagram of operation of a media client.
Figure 5:
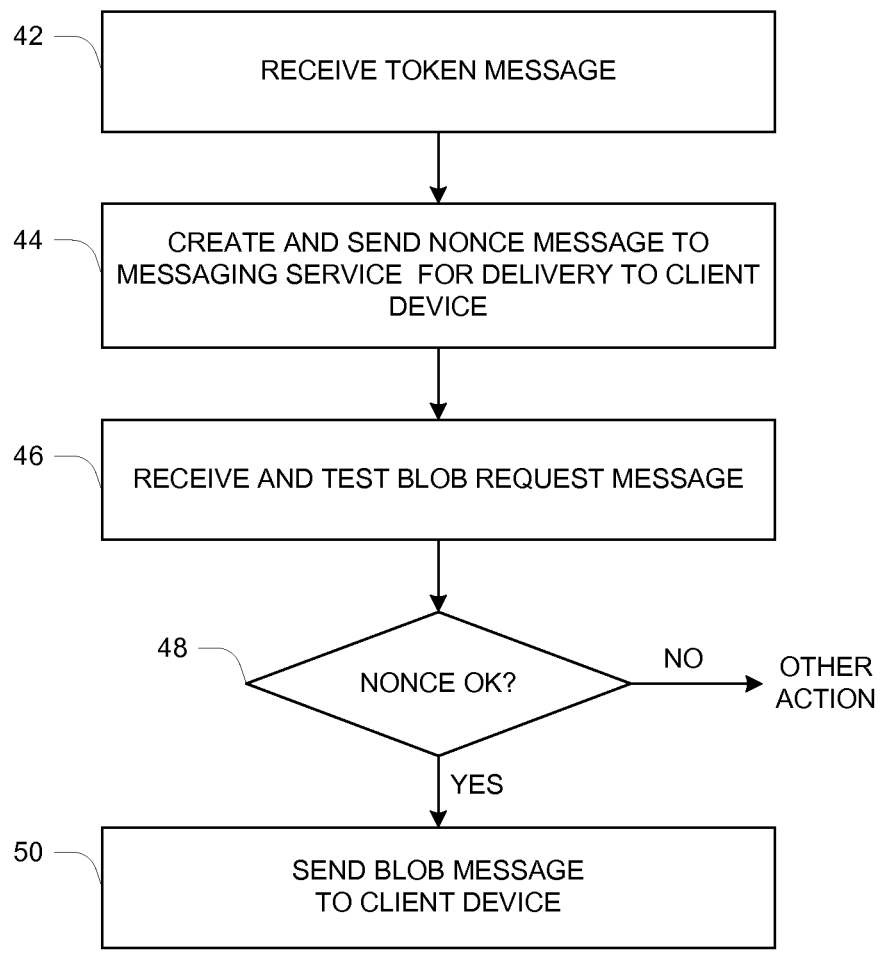
FIG. 5 is a flow diagram of operation of a media support server.

FIGS. 4 and 5 are flow diagrams for processes performed at the media client 26 and media support server 12, respectively, as part of the above-described overall authentication process. Referring to FIG. 4, at 30 the media client 26 obtains the device token used in the messaging session, and at 32 it sends the token message to the media support server 12. At 34 it receives the nonce message via the messaging server 14, and at 36 it processes the nonce message as described above. It then generates the blob request message and sends it to the media support server 12. At 38, it receives the blob message containing the secret value, and at 40 it uses the secret value to access protected media.

Referring to FIG. 5, at 42 the media support server 12 receives the token message having the device token, and at 44 it creates the nonce message and sends it to the messaging server 14 for delivery to the client device 10. At 46, it receives the blob request message and performs testing such as described above. Specifically, at 48 it compares the received nonce to the nonce that it generated and included in encrypted form in the nonce message. If this comparison is successful, then at 50 it sends the blob message including the secret value to the media client device 10 via the messaging server 14, and otherwise it takes other action which may include withholding the blob message. The comparison of nonce values may be for identity (i.e., one equals the other), or in other embodiments it may involve looking for some other predetermined relationship between them.

As previously indicated, by using the trusted messaging or notification mechanism via the messaging server 14, there is increased confidence that the media support server 12 is communicating with a legitimate media client 26 which is running on a real media client device 10 with an expected device operating system 24 (e.g., iOS). This mechanism may employ a "provisioning profile" with which the media client 26 was built, used to ensure that received messages/notifications are routed to the correct application on the correct device. If applicable, the provisioning profile has messaging/notification enabled. The provisioning profile may be signed with the messaging service provider's key which is stored in secure storage on the device 10. The use of the messaging service alone does not establish device integrity, as an attacker may be able to make notifications work on a jail-broken device. However, the receipt of notifications does indicate that an untouched/unmodified media client 26 is running on an actual media client device 10 such as a mobile phone or tablet computer. Also, the correct receipt of notifications indicates that it is safe to rely on the device integrity information received from the media client 26.

Another aspect of the disclosed technique is that service providers wishing to use the messaging service (such as the media support server 12) are required to connect to the messaging server 14 through a persistent and secure channel such as SSL, which may require using a security certificate issued by a certificate authority. In the case of iOS, such certificates are obtained from an iOS Developer Program portal prior to the deployment of the service. Each such security certificate is limited to a single application, such as a media client application 26, as may be identified by the application's bundle id for example.

Additionally, the use of white-box AES increases confidence that the blob request message that leads to the sending of the blob message was not modified in transit.

Finally, the use of the nonce ties the blob to a particular media client instance. The blob produced by the media support server 12 can be used only by the same instance of the media client 26 that generated the request for the blob, because obfuscation of the blob depends not only on the owner, user, and device, but also on the nonce, which only a single valid instance of the media client 26 can obtain and use.

While various embodiments of the invention have been particularly shown and described, it will be understood by those skilled in the art that various changes in form and details may be made therein without departing from the spirit and scope of the invention as defined by the appended claims.

What is claimed is:

1. A method by which a media support server establishes trusted communication with a media client application executing on a media client device, comprising:
    receiving a token from the media client device, the token originating in a persistent secure messaging session used for carrying messaging communications between the media client device and a messaging server, the token uniquely identifying the media client device and the media client application;
    creating a nonce message and sending it to the messaging server for delivery to the media client device via the persistent secure messaging session, the nonce message including an encrypted nonce value resulting from encryption of a generated nonce value according to a nonce encryption process, the nonce encryption process having a counterpart nonce decryption process configured into the media client application for use in decrypting the encrypted nonce value;
    receiving a blob request message identifying the media client device, a user, and a content owner, the blob request message including a decrypted nonce value; and
    testing the blob request message and conditionally sending a blob message to the media client device via a secure channel based on the testing, the blob message including a secret value usable by the media client application to access protected media of the content owner for playback to the user, the testing including evaluating whether the decrypted nonce value has a predetermined relationship to the generated nonce value.

2. A method according to claim 1, wherein the blob request message includes device integrity information indicating whether the media client device has been tampered with, and the testing includes evaluating whether the media client device has an acceptable level of integrity based on the device integrity information.

3. A method according to claim 1, wherein the nonce encryption process and nonce decryption process are symmetric processes using a shared key value.

4. A method according to claim 3, wherein the nonce decryption process is a white-box nonce decryption process that uses the shared key value while obfuscating it to an observer.

5. A method according to claim 1, wherein the secure channel employs a blob encryption process using a blob encryption key configured into the media client device, the blob encryption key being distinct from a nonce key used in the nonce encryption process.

6. A method by which a media client application executing on a media client device establishes trusted communication with a media server to obtain a secret value usable to access protected media of a content owner, comprising:
    maintaining a persistent secure messaging session for receiving messaging communications from a messaging server, the persistent secure messaging session originating a token uniquely identifying the media client device and media client application;
    sending the token to the media server;
    receiving a nonce message from the media server via the persistent secure messaging session, the nonce message including an encrypted nonce value resulting from encryption of a generated nonce value according to a nonce encryption process, the nonce encryption process having a counterpart nonce decryption process configured into the client device for use in decrypting the encrypted nonce value;
    generating a blob request message and sending it to the media server, the blob request message identifying the media client device, a user, and the content owner, the blob request message including a decrypted nonce value obtained by decrypting the encrypted nonce value from the nonce message; and
    receiving a blob message from the media server, the blob message including a blob containing the secret value for use by the media client application in accessing the protected media of the content owner.

7. A method according to claim 6, further including performing device integrity checking to gather device integrity information indicating whether the media client device has been tampered with, and wherein the device integrity information is included in the blob request message to enable the media server to evaluate whether the media client device has an acceptable level of integrity to be permitted to access the media of the content owner.

8. A method according to claim 6, wherein the nonce encryption process and nonce decryption process are symmetric processes using a shared key value.

9. A method according to claim 8, wherein the nonce decryption process is a white-box nonce decryption process that uses the shared key value while obfuscating it to an observer.

10. A method according to claim 6, wherein the secure channel employs a blob encryption process using a blob encryption key configured into the media client device, the blob encryption key being distinct from a nonce key used in the nonce encryption process.

11. A media support server, comprising:
one or more processors;
memory coupled to the processors; and
interface circuitry coupled to the processors and memory, the interface circuitry providing a functional connection to a media client device and a messaging server;
wherein the memory stores computer program instructions which, when executed by the processors, cause the media support server to perform a method of establishing trusted communication with a media client application executing on the media client device, including:
receiving a token originating in a persistent secure messaging session used for carrying messaging communications between the media client device and the messaging server, the token uniquely identifying the media client device and the media client application;
creating a nonce message and sending it to the messaging server for delivery to the media client device via the persistent secure messaging session, the nonce message including an encrypted nonce value resulting from encryption of a generated nonce value according to a nonce encryption process, the nonce encryption process having a counterpart nonce decryption process configured into the media client application for use in decrypting the encrypted nonce value;
receiving a blob request message identifying the media client device, a user, and a content owner, the blob request message including a decrypted nonce value; and
testing the blob request message and conditionally sending a blob message to the media client device via a secure channel based on the testing, the blob message including a secret value usable by the media client application to access protected media of the content owner for playback to the user, the testing including evaluating whether the decrypted nonce value has a predetermined relationship to the generated nonce value.

12. A media support server according to claim 11, wherein the blob request message includes device integrity information indicating whether the media client device has been tampered with, and the testing includes evaluating whether the media client device has an acceptable level of integrity based on the device integrity information.

13. A media support server according to claim 11, wherein the nonce encryption process and nonce decryption process are symmetric processes using a shared key value.

14. A media support server according to claim 13, wherein the nonce decryption process is a white-box nonce decryption process that uses the shared key value while obfuscating it to an observer.

15. A media support server according to claim 11, wherein the secure channel employs a blob encryption process using a blob encryption key configured into the media client device, the blob encryption key being distinct from a nonce key used in the nonce encryption process.

16. A media client device, comprising:
one or more processors;
memory coupled to the processors; and
interface circuitry coupled to the processors and memory, the interface circuitry providing a functional connection to a media support server and a messaging server;
wherein the memory stores computer program instructions of a media client application which, when executed by the processors, cause the media client device to perform a method of establishing trusted communication with the media server to obtain a secret value usable to access protected media of a content owner, including:
maintaining a persistent secure messaging session for receiving messaging communications from the messaging server, the persistent secure messaging session originating a token uniquely identifying the media client device and media client application;
sending the token to the media server;
receiving a nonce message from the media server via the persistent secure messaging session, the nonce message including an encrypted nonce value resulting from encryption of a generated nonce value according to a nonce encryption process, the nonce encryption process having a counterpart nonce decryption process configured into the client device for use in decrypting the encrypted nonce value;
generating a blob request message and sending it to the media server, the blob request message identifying the media client device, a user, and the content owner, the blob request message including a decrypted nonce value obtained by decrypting the encrypted nonce value from the nonce message; and
receiving a blob message from the media server, the blob message including a blob containing the secret value for use by the media client application in accessing the protected media of the content owner.

17. A media client device according to claim 16, wherein the method of establishing trusted communications further includes performing device integrity checking to gather device integrity information indicating whether the media client device has been tampered with, and wherein the device integrity information is included in the blob request message to enable the media server to evaluate whether the media client device has an acceptable level of integrity to be permitted to access the media of the content owner.

18. A media client device according to claim 16, wherein the nonce encryption process and nonce decryption process are symmetric processes using a shared key value.

19. A media client device according to claim 18, wherein the nonce decryption process is a white-box nonce decryption process that uses the shared key value while obfuscating it to an observer.

20. A media client device according to claim 16, wherein the secure channel employs a blob encryption process using a blob encryption key configured into the media client device, the blob encryption key being distinct from a nonce key used in the nonce encryption process.

* * * * *